United States Patent [19]

Gehringer et al.

[11] Patent Number: 5,477,517
[45] Date of Patent: Dec. 19, 1995

[54] METHOD FOR THE RECORDING AND REPRODUCING OF DATA

[75] Inventors: Reinhard Gehringer, Blumberg; Hans-Robert Kühn, St. Georgen, both of Germany

[73] Assignee: Deutsche Thomson-Brandt GmbH, Villingen-Schwenningen, Germany

[21] Appl. No.: 123,349

[22] Filed: Sep. 17, 1993

[30] Foreign Application Priority Data

Sep. 17, 1992 [DE]  Germany .......................... 42 31 117.9

[51] Int. Cl.$^6$ ..................................................... G11B 7/00
[52] U.S. Cl. .............................. 369/50; 369/60; 369/54
[58] Field of Search .................................. 369/32, 48, 47, 369/54, 58, 59, 60, 50, 44.32, 44.28, 124; 358/342

[56]  References Cited

U.S. PATENT DOCUMENTS

| | | | |
|---|---|---|---|
| 4,224,481 | 9/1980 | Russell | 369/97 |
| 4,789,975 | 12/1988 | Taniyama | 369/50 |
| 4,829,497 | 5/1989 | Sako et al. | 369/50 |
| 5,212,678 | 5/1993 | Roth et al. | 369/32 |
| 5,214,631 | 5/1993 | Maeda et al. | 369/59 |
| 5,220,545 | 6/1993 | Tomimitsu | 369/44.28 |
| 5,255,103 | 10/1993 | Honjo | 358/342 |
| 5,291,468 | 3/1994 | Carmon et al. | 369/47 |
| 5,313,443 | 5/1994 | Iitsuka | 369/50 |
| 5,317,553 | 5/1994 | Ohga et al. | 369/54 |

*Primary Examiner*—Georiga Y. Epps
*Assistant Examiner*—Nabil Hindi
*Attorney, Agent, or Firm*—Max Fogiel

[57]  ABSTRACT

A method for recording and reproducing compressed data to improve the utilization of the storage capacity of a moving recording medium. The data are compressed prior to a recording step. Prior to reproduction the data are expanded to retrieve the original data signal. To increase the storage capacity of the recording medium even further, the velocity of the recording medium is regulated as a function of the degree of compression. With a high degree of compression, a smaller velocity of the recording medium is selected, than with a low degree of compression.

6 Claims, 2 Drawing Sheets

METHOD FOR THE RECORDING AND REPRODUCING OF DATA

BACKGROUND OF THE INVENTION

The invention relates to a method for the recording of data onto a moving recording medium and for the reproduction of the data free of loss from the recording medium whereby on the recording side a data compression with differing degrees of compression and on the reproduction side a data expansion is carried out.

Data compression and data expansion are frequently used in the transmission of information in order to, for example, increase the capacity of transmission channels or the storage capacity of recording media. For example, on the so-called Mini-Disk, a further development of the compact disk, the data are recorded in compressed form.

In data compression the data to be stored or to be transmitted are compressed using a suitable algorithm. This means, in other words, that the amount of data to be transmitted or stored respectively is reduced in order to increase the transmission capacity of the transmission channel or, respectively, the storage capacity of the recording medium.

On the reproduction or receiving side respectively an expander generates the original data from the reduced amount of data using the inverse algorithm.

The aim of data compression is, as mentioned above, to reduce the amount of data as much as possible without creating loss of data in order to better utilize the transmission capacity of a transmission channel or the storage capacity of a recording medium.

It is known, with the recording of data, to read the data to be recorded into an intermediate memory prior to the recording. Likewise, it is known, with the reproducing of data, to first read the data to be reproduced into an intermediate memory prior to the reproduction. However, if the intermediate memory overflows loss of data occurs not only with the recording but also with the data reproduction. In order to keep such loss of data as small as possible, upon recording the data, the most important bits are first generated by means of the algorithm and stored so that less important bits which do not materially contribute to the regeneration of the original data signal are stored last or, respectively, get lost upon overflow of the intermediate memory. In the latter case a recording of the data free of loss is no longer possible.

Similarly, upon reading out the data the most important bits are read out firstly and lastly those bits which do not materially contribute to the regeneration of the original data signal. Here too, loss of data occurs upon overflow of the intermediate memory as the less important bits get lost through the overflow.

To avoid loss of data through overflow of the intermediate memory intermediate memories with sufficiently large storage capacity are required.

SUMMARY OF THE INVENTION

Now, it is the object of the invention to design a method for the recording and reproduction of compressed data free of loss in such a way that the storage capacity of the recording medium is exploited more effectively than in the state of the art.

The invention solves this task in that the velocity of the recording medium is regulated during data recording as well as during data reproduction as a function of the degree of compression.

DESCRIPTION OF THE PREFERRED EMBODIMENTS

Figure 1:
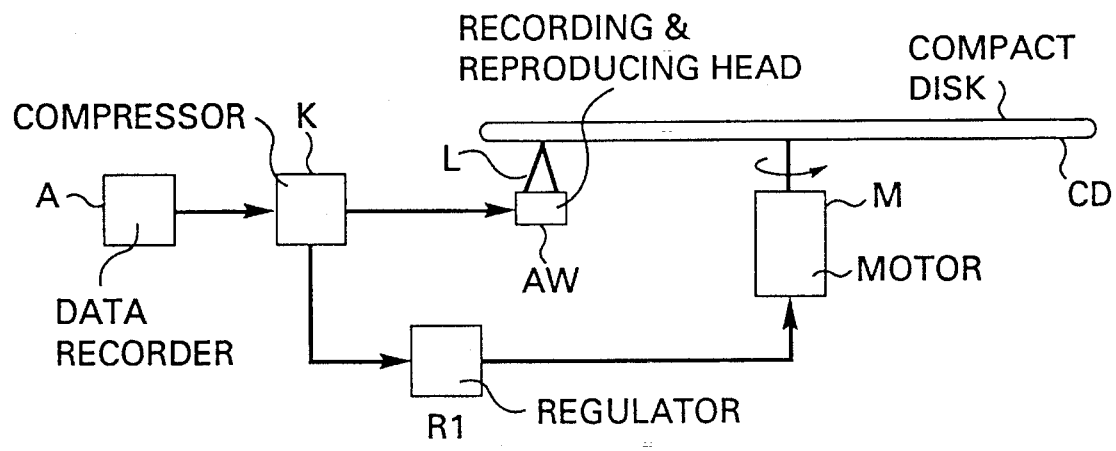
FIG. 1 shows a first embodiment example of the invention with the recording of data onto a disk-type recording medium.
Figure 2:
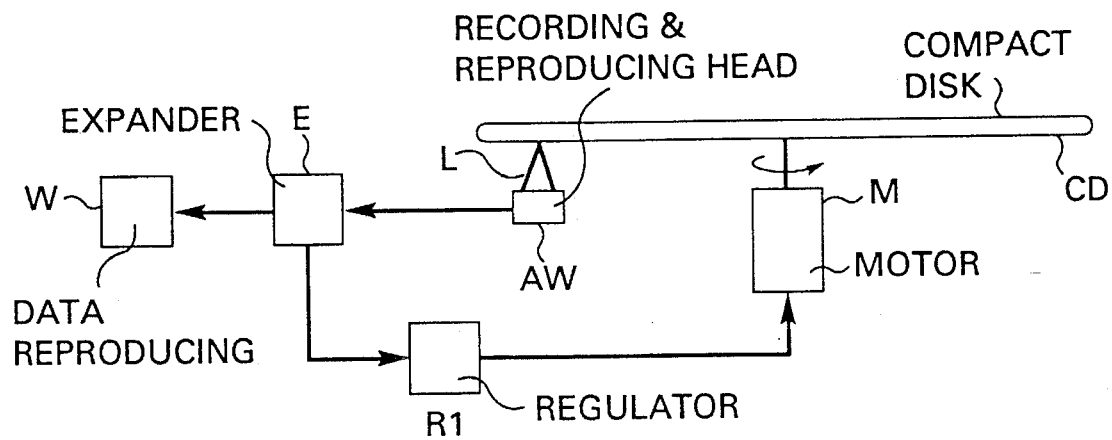
FIG. 2 shows the first embodiment example with the reproduction of data from a disk-type recording medium.

The method according to the invention will now be explained for the recording of data on the basis of the first embodiment example shown in FIG. 1.

A data recording facility A which serves as a source of digital data supplies the data to be recorded in digital form in a fixed time frame to a compressor K which compresses the data in accordance with a predeterminable algorithm. The compressed data are recorded on a recording medium. FIG. 1 shows a magneto-optical disk CD, rotated by a motor M, as an example for the recording medium. The data are recorded on the disk CD by means of a light beam L which is generated by a recording and reproducing head AW, in CD players usually referred to as pick-up. A control output of the compressor K is coupled with the input of a regulator R1 which regulates the rotational speed of the motor M.

In a CD player the data are recorded and reproduced at constant track velocity. Therefore, this is usually referred to as a constant linear velocity system abbreviated CLV system—as opposed to a constant angular velocity system, abbreviated CAV system, where the data are recorded and reproduced at constant angular velocity. As mentioned above, loss of data can now occur if the intermediate memory overflows.

Now, the invention provides that the velocity of the recording medium CD be regulated as a function of the degree of compression. In case of a high degree of compression the velocity of the disk is reduced for the recording as well as for the reproduction of the data while it is increased for a lower degree of compression. The measure of reducing the velocity of the recording medium by way of deviation from the standard velocity in case of a high degree of compression markedly increases the storage capacity of the recording medium.

The regulator R1 regulates the rotational speed of the disk CD as a function of the respectively current degree of compression of the compressor K. It is advisable, for example, to regulate the rotational speed of the disk CD inversely proportional to the degree of compression. With the method according to the invention an intermediate memory is not absolutely necessary in order to avoid loss of data.

Figure 3:
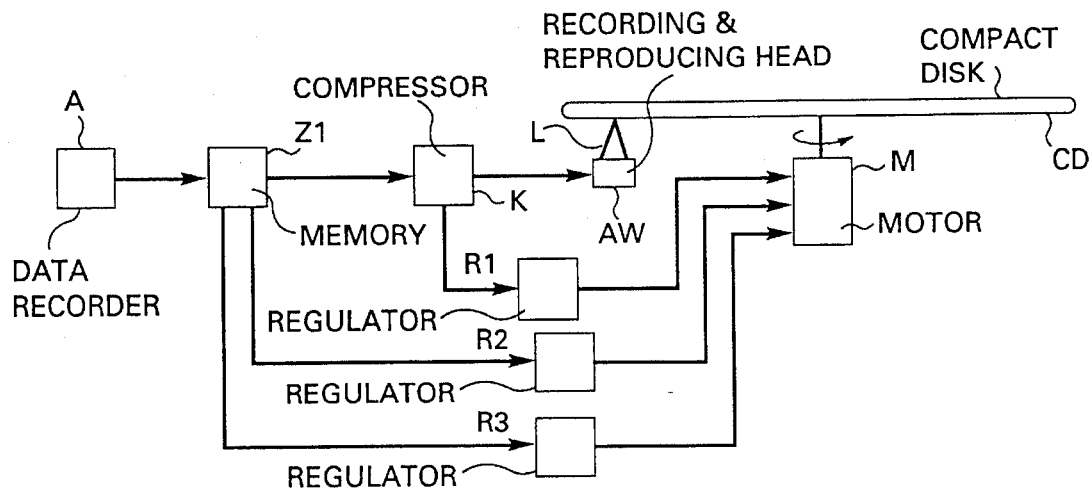
FIG. 3 shows a second embodiment example of the invention with the recording of data onto a disk-type recording medium.
Figure 4:
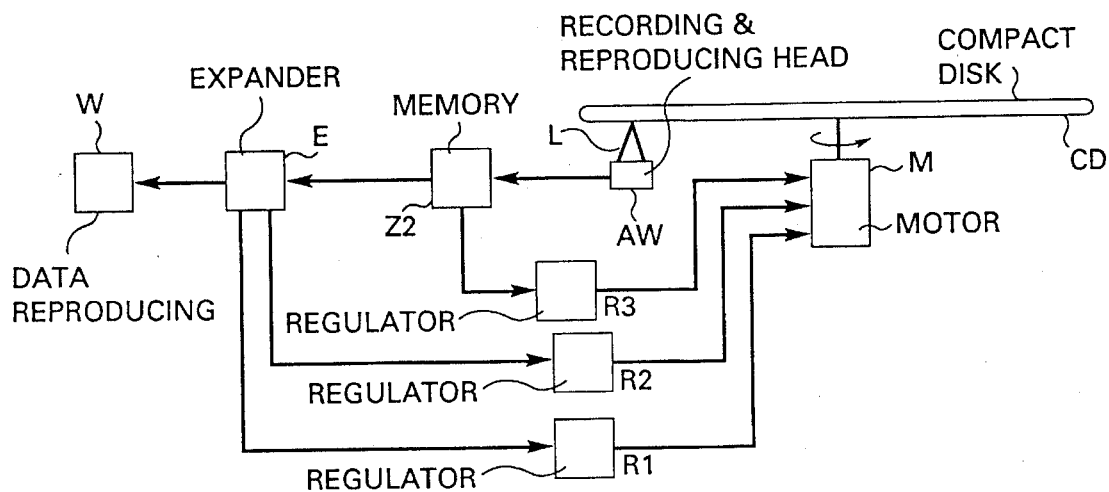
FIG. 4 shows the second embodiment example with the reproduction of data from a disk-type recording medium.

In the second embodiment example of the invention, which is shown in FIGS. 3 and 4, an intermediate memory as well as, besides the first regulator, an additional second and third regulator are provided.

During the recording of the data, which is shown in FIG. 3, the data recording facility A supplies digital data to an intermediate memory Z1 which forwards them, following intermediate storing, to the compressor K for compression. Using the light beam L generated by the recording and reproducing head AW the compressed data are recorded on the disk CD. A control output of the compressor K is coupled with the input of a first regulator R1 which, together with a second regulator R2 and a third regulator R3, regulates the rotational speed of the motor M which rotates the disk CD.

The second regulator R2 is coupled with the first control input of the intermediate memory Z1. Like in the first embodiment example, the first regulator R1 regulates the rotational speed of the disk CD as a function of the degree of compression of the compressor K. The second superimposed regulatory loop comprising the regulator R2 regulates the rotational speed of the disk CD as a function of the level of the intermediate memory Z1. If the intermediate memory Z1 is full or nearly full then the rotational speed of the disk CD is increased in order to prevent overflow of the intermediate memory Z1; if, however, the intermediate memory is empty or nearly empty then the rotational speed of the disk CD is reduced in order to fill up the intermediate memory with data.

Using the third regulator R3 a third regulating variable for the regulation of the rotational speed of the disk CD is generated from the difference of data influx DZ and data discharge DA at the intermediate memory Z1. If the difference DZ - DA is positive then the rotational speed of the disk CD is increased in order to prevent overflow of the intermediate memory Z1, while in the case of the difference DZ—DA being negative the rotational speed is reduced in order to fill up the intermediate memory Z1 with data again.

Now, it is possible to provide only one of the three regulators R1, R2 and R3 or only 2 or all three regulators for the regulation of the rotational speed of the disk CD. All combinations—altogether 7—are possible.

FIG. 4 depicts the second embodiment example for the case of data reproduction.

Using the light beam L from the recording and reproducing head AW the data are read from the disk CD and transmitted to the expander E which forwards them to an intermediate memory Z2. From the intermediate memory Z2 the data are sent to a data reproducing facility W, for example, a loudspeaker.

The regulator R1 which is coupled with the control output of the expander E regulates the rotational speed of the disk CD as a function of the degree of compression. In case of a high degree of compression the rotational speed is reduced from the standard rotational speed, in case of a low one it is increased again up to the standard rotational speed.

The second regulator R2 regulates the rotational speed of the disk CD as a function of the level of the intermediate memory Z2. In case of a high level it causes a reduction of the rotational speed in order to prevent overflow of the intermediate memory Z2, while in the case of a low level it increases the rotational speed in order to avoid emptying of the intermediate memory Z2.

The third regulator R3 evaluates the difference DZ - DA between data influx DZ and data discharge DA. If more data flow into the intermediate memory Z2 than are discharged again to the reproducing facility W, in this case DZ - DA is positive, then the rotational speed is reduced so that the intermediate memory Z2 does not overflow. If, on the other hand, the intermediate memory Z2 receives less data from the recording and reproducing head AW than it discharges to the data reproducing facility W then the regulator R3 increases the rotational speed in order to fill up the intermediate memory Z2 with data again. With the data reproduction too, it is possible to use only one or two or all three regulators. Every conceivable combination is possible.

However, the invention is in no way limited to disk-type recording media. Besides CD players, magneto-optical recording and playback apparatus operating with disks as storage media, the invention may also be applied with tape devices. Also, a cylinder, for example, would be a suitable recording medium.

Any type of data may be used. These may be, for example, the audio data with a CD player, the audio and video data of a video disk player or the data in an electronic data processing system. The only decisive factor is that it must be compressed data which have been or are stored on a recording medium which moves like, for example, a rotating disk or a linearly moved tape.

We claim:

1. A method for recording data onto a recording medium and for reproducing free of loss from said recording medium, comprising the steps of: recording a compression of the data with differing degrees of compression on a recording side of said recording medium; expanding the data on a reproduction side of said recording medium during a reproducing step, said recording medium having a velocity; and regulating said velocity during said recording and said reproducing steps as a function of the degree of compression; said velocity of said recording medium being selected smaller for a high degree of compression than for a low degree of compression; storing the data to be recorded in a first intermediate memory higher to said recording step; storing the data reproduced from the recording medium in a second intermediate memory prior to said reproducing step; said velocity of said recording medium being regulated as a function of a level of said first intermediate memory and said second intermediate memory; increasing the velocity of said recording medium during said recording step when said intermediate memory is at a high level and reducing the velocity at a low level of said first intermediate memory, the velocity of said recording medium being reduced at a high level of said second intermediate memory and being increased at a low level of said second intermediate memory during said reproducing step; the velocity of said recording medium being regulated as a function of a difference of a data influx and a data discharge; during said recording step the velocity of said recording medium being increased when said data influx at said first intermediate memory is larger than said data discharge, the velocity of said recording medium being reduced when said data influx at said first intermediate memory is smaller than said data discharge; during said reproducing step the velocity of said recording medium being increased when said data influx at said second intermediate memory is larger than said data discharge, the velocity being reduced when said data influx of said second intermediate memory is smaller than said data discharge.

2. A method for recording data onto a recording medium and for reproducing free of loss from said recording medium, comprising the steps of: recording a compression of the data with differing degrees of compression on a recording side of said recording medium; expanding the data on a reproduction side of said recording medium during a reproducing step, said recording medium having a velocity; and regulating said velocity during said recording and said reproducing steps as a function of the degree of compression, the velocity of said recording medium being selected smaller for a high degree of compression than for a low degree of compression.

3. A method for recording data onto a recording medium and for reproducing free of loss from said recording medium, comprising the steps of: recording a compression of the data with differing degrees of compression on a recording side of said recording medium; expanding the data on a reproduction side of said recording medium during a reproducing step, said recording medium having a velocity; and regulating said velocity during said recording and said reproducing steps as a function of the degree of compression; storing the data to be recorded in a first intermediate memory prior to said recording step; and storing the data reproduced from said recording medium in a second intermediate memory prior to said reproducing step, the velocity of said recording medium being regulated as a function of a level of said first intermediate memory and said second intermediate memory.

4. A method for recording data onto a recording medium and for reproducing free of loss from said recording medium, comprising the steps of: recording a compression of the data with differing degrees of compression on a recording side of said recording medium; expanding the data on a reproduction side of said recording medium during a reproducing step, said recording medium having a velocity; and regulating said velocity during said recording and said reproducing steps as a function of the degree of compression; storing the data to be recorded in a first intermediate memory with a first storage capacity prior to said recording step; and storing the data reproduced from said recording medium in a second intermediate memory with a second storage capacity prior to said reproducing step, the velocity of said recording medium being regulated as a function of a difference of a data influx and a data discharge for changing said first storage capacity and said second storage capacity.

5. A method as defined in claim 3, including the step of increasing the velocity of said recording medium during said recording step when said first intermediate memory is at a high level and reducing the velocity at a low level of said first intermediate memory, the velocity of said recording medium being reduced at a high level of said second intermediate memory and being increased at a low level of said second intermediate memory during said reproducing step.

6. A method as defined in claim 4, wherein during said recording step the velocity of said recording medium is increased when said data influx at said first intermediate memory is larger than said data discharge, the velocity of said recording medium being reduced when said influx at said first intermediate memory is smaller than said data discharge; during said reproducing step the velocity of said recording medium being increased when said data influx at said second intermediate memory is larger than said data discharge, said velocity being reduced when said data influx of said second intermediate memory is smaller than said data discharge.

* * * * *